(12) United States Patent
Lorscheider (10) Patent No.: US 10,518,579 B1
(45) Date of Patent: *Dec. 31, 2019

(54) SPLIT OFFSET AXLE

(71) Applicant: Brent Lorscheider, Eugene, OR (US)

(72) Inventor: Brent Lorscheider, Eugene, OR (US)

( * ) Notice: Subject to any disclaimer, the term of this patent is extended or adjusted under 35 U.S.C. 154(b) by 72 days.

This patent is subject to a terminal disclaimer.

(21) Appl. No.: 15/713,713

(22) Filed: Sep. 25, 2017

(51) Int. Cl.
*B60B 35/04* (2006.01)
*B62K 25/02* (2006.01)
*B62K 25/24* (2006.01)
*B62K 21/02* (2006.01)

(52) U.S. Cl.
CPC .............. *B60B 35/04* (2013.01); *B62K 25/02* (2013.01); *B62K 25/24* (2013.01); *B60B 2900/911* (2013.01); *B62K 21/02* (2013.01)

(58) Field of Classification Search
CPC . B60B 27/023; B60B 35/04; B60B 2900/911; B62K 25/02
See application file for complete search history.

(56) References Cited

U.S. PATENT DOCUMENTS

| | | | |
|---|---|---|---|
| 423,051 A | 3/1890 | Haven | |
| 456,604 A | 7/1891 | Thompson | |
| 605,182 A | 6/1898 | Johnston | |
| 1,679,819 A | 8/1928 | Fageol | |
| 2,125,568 A | 8/1938 | Huyssen et al. | |
| 2,395,230 A | 2/1946 | Lucas | |
| 2,428,148 A | 9/1947 | Dawson | |
| 2,555,480 A | 6/1951 | Fischer | |
| 3,084,950 A | 4/1963 | Rass | |
| 3,336,046 A | 8/1967 | Selling | |
| 3,371,944 A | 3/1968 | Daniels | |
| 3,521,904 A | 7/1970 | Sheffer | |
| 3,647,241 A | 3/1972 | Huyssen | |
| 3,717,361 A | 2/1973 | Vanderpool | |
| 3,770,295 A | 11/1973 | Sword | |
| 3,799,581 A | 3/1974 | Munn | |
| 3,817,120 A | 6/1974 | Clay | |
| 3,831,977 A | 8/1974 | Osborne et al. | |
| 3,971,571 A | 7/1976 | Yoshioka | |
| 4,082,307 A | 4/1978 | Tait | |
| 4,184,695 A | 1/1980 | Roe et al. | |

(Continued)

FOREIGN PATENT DOCUMENTS

FR 3005028 A1 * 10/2014 ............. B60B 35/02

OTHER PUBLICATIONS

Machine Translation of FR 3005028 (Year: 2014).*

*Primary Examiner* — Michael C McCullough (57) ABSTRACT

A split offset axle joins a front cycle wheel to a first and a second fork of a cycle. The axle has two rigid structures joined together with a fastener to form a singular axle. The axle has a cylindrical first end, a cylindrical second end and a cylindrical offset center section. The center section locates and supports a cycle wheel hub. The first and the second ends are housed in a pinchable split axle housing of the first and the second fork, respectively. Rotation of the axle adjusts the center section axis to a plurality of positions relative to the forks. The center section is adjusted to a desired position, thereby adjusting the cycle's steering and handling characteristics, the desired position is secured with pinched split axle housings. The pinched split axle housings rotationally and rigidly secure the respective axle ends.

21 Claims, 5 Drawing Sheets

(56) References Cited

U.S. PATENT DOCUMENTS

| | | |
|---|---|---|
| 4,260,170 A | 4/1981 | Terai et al. |
| 4,421,308 A | 12/1983 | Nagy |
| 4,565,384 A | 1/1986 | Dehnisch |
| 4,588,232 A | 5/1986 | Kim et al. |
| 4,602,822 A | 7/1986 | Kim et al. |
| 4,624,470 A | 11/1986 | Love |
| 4,638,881 A | 1/1987 | Morioka et al. |
| 4,755,005 A | 7/1988 | Tsai |
| 4,756,547 A | 7/1988 | Trema |
| 4,776,609 A | 10/1988 | Pan et al. |
| 4,834,412 A | 5/1989 | Trema |
| 4,875,543 A | 10/1989 | Verkuylen |
| 4,889,354 A | 12/1989 | Wen |
| 4,952,196 A | 8/1990 | Chilcote et al. |
| 4,993,734 A | 2/1991 | Trema |
| 5,002,295 A | 3/1991 | Lin |
| 5,165,762 A | 11/1992 | Phillips |
| 5,233,885 A | 8/1993 | Lin et al. |
| 5,238,259 A | 8/1993 | Wilson et al. |
| 5,240,087 A | 8/1993 | Parker |
| 5,249,847 A | 10/1993 | Lee |
| 5,363,633 A | 11/1994 | Masaru |
| 5,413,368 A | 5/1995 | Pong et al. |
| 5,417,305 A | 5/1995 | Parker |
| 5,553,878 A | 9/1996 | Davignon et al. |
| 5,588,662 A | 12/1996 | Fortier |
| 5,851,165 A | 12/1998 | Wei et al. |
| 5,967,538 A | 10/1999 | Callaluca et al. |
| 6,109,635 A | 8/2000 | Maeda et al. |
| 6,152,472 A | 11/2000 | Woodside |
| 6,155,370 A | 12/2000 | Iwai et al. |
| 6,186,918 B1 | 2/2001 | Yoo |
| 6,230,849 B1 | 5/2001 | Lumpkin |
| 6,260,869 B1 | 7/2001 | Hanlon et al. |
| 6,371,571 B1 | 4/2002 | Tsan |
| 6,374,975 B1 | 4/2002 | Schlanger |
| 6,412,803 B1 | 7/2002 | Lalikyan et al. |
| 6,474,432 B1 * | 11/2002 | Schmidt ............... B62K 21/02 180/209 |
| 6,485,043 B2 | 11/2002 | Ito et al. |
| 6,536,550 B2 | 3/2003 | Schmidt et al. |
| 6,609,721 B2 | 8/2003 | Clift, Jr. |
| 6,708,999 B1 | 3/2004 | Baltes et al. |
| 6,926,297 B2 | 8/2005 | Czysz |
| 6,966,571 B2 | 11/2005 | Czysz |
| 7,125,029 B2 | 10/2006 | Knox et al. |
| 7,273,259 B2 | 9/2007 | Fukui |
| 7,347,438 B2 | 3/2008 | Raddin |
| 7,669,870 B2 * | 3/2010 | Eaton ..................... B60B 27/02 280/275 |
| 9,145,029 B2 * | 9/2015 | Lorscheider ......... B60B 35/004 |
| 9,738,117 B1 * | 8/2017 | Lorscheider ............ B60B 35/04 |
| 2002/0060441 A1 | 5/2002 | Feng |
| 2002/0167150 A1 | 11/2002 | Clift |
| 2009/0121446 A1 | 5/2009 | Mercat |

* cited by examiner

SPLIT OFFSET AXLE

BACKGROUND

Cycles often utilize an axle to connect a cycle front wheel to two cycle forks, the axle is secured to the forks by an axle housing located on each fork. The forks are typically connected to a cycle frame by a steering stem and triple clamps. The position of the front wheel axle relative to the steering stem determines two important attributes commonly referred to as the "trail" and the "rake," the rake also referred to as the "steering angle or castor."

The trail and rake are significant factors determining the cycle's handling and steering characteristics. The prior art for adjusting trail and rake include, but are not limited to: various offset triple clamps; adjustable offset triple clamps; adjustable axle carriers; adjustable stems; and adjustable eccentric axles. A simple two piece offset axle is desired to adjust the front wheel location relative to the cycle forks in order to adjust the cycle's steering and handling manners.

SUMMARY

A split offset axle consist of a first axle structure and a second axle structure, the axle structures are joined together with a fastener to form the axle. The axle has a cylindrical first end and a cylindrical second end, a longitudinal center axis of the first end and a longitudinal center axis of the second end are aligned. A cylindrical center section is located between the first end and the second end, a longitudinal center axis of the center section is parallel to and offset from the first end and the second end. The first axle structure has an engagement feature and the second axle structure has an engagement feature. The first axle structure engagement feature and the second axle structure engagement feature are configured to engage each other, the engagement rotationally and linearly aligns the axle structures with each other, the engagement rotationally secures the axle structures to each other. The center section of the axle supports a hub of a cycle wheel. The axle connects the cycle wheel to a first and second fork of a cycle. The axle first end is housed in pinchable split axle housing of the first fork and the axle second end is housed in a pinchable split axle housing of the second fork. Rotation of a partially installed axle in the split axle housings adjusts the wheel position relative to the forks. The first end and the second end have features for rotational engagement of the axle. Rotation of the axle adjust the center section of a partially installed axle to a desired position relative to the forks, the adjusted partially installed axle is joined with the fastener to form a singular rigid structure, the fastener also fastens the wheel hub to the axle. The fastened axle is rigidly and rotationally secured to the forks by pinching the split axle housings.

In a preferred embodiment the first axle structure consist of a first half axle, the second axle structure consist of a second half axle, and the fastener consist of a bolt, the bolt joins the first and second half axles to form the axle. The cylindrical center section of the joined axle is located between the first end and the second end. The center section longitudinal axis is offset from the aligned axis of the first end and the second end. Each half axle has an interlocking engagement feature and each half axle has a bore to receive the axle bolt. Each half axle is installed through the respective split axle housing, a spacer, and a side of a wheel hub. The axle bolt is installed but not torqued resulting in a partially installed axle. The partially installed axle is rotated in the split axle housings to a desired position thereby adjusting the location of the center section and the cycle wheel relative to the forks. Torqueing the axle bolt joins the half axles together, the joined half axles form the rigid singular axle. The joined axle generates an inward longitudinal force against each side of the wheel hub thereby laterally securing the wheel hub and wheel. The respective split axle housings are pinched to directly engage and clamp the first end and the second end of the axle to form rigid and rotationally secured connections between the axle housings and the axle ends.

BRIEF DESCRIPTION OF THE DRAWINGS

A more particular description of the present disclosure will be rendered by reference to specific embodiments thereof that are illustrated in the drawings. It is appreciated that these drawings depict only typical embodiments of the invention and are therefore not to be considered limiting of its scope. Example embodiments of the invention will be described and explained with additional specificity and detail through the use of the accompanying drawings in which.

DETAILED DESCRIPTION

A split offset axle is disclosed, the axle connects a cycle wheel to a first fork and a second fork of a cycle, the axle is connected to the forks by a split axle housing of each fork. The axle has a rigid first axle structure and a rigid second axle structure. The first and second axle structures are joined together by an axle fastener, the joined axle structures form a singular rigid axle.

A first end of the axle is a cylindrical form with an eccentric step. A second end of the axle is a cylindrical form with an eccentric step. The first end and the second end of the axle are configured to apply a first inward longitudinal force and a second inward longitudinal force, respectively. A longitudinal center axis of the first end is aligned with a longitudinal center axis of the second end. A center section is located between the first end and the second end, the center section has a cylindrical form, the center section is eccentric with the first and second ends. A longitudinal axis of the center section is parallel with and offset to the aligned axes of the first and second ends. The center section locates and supports a wheel hub of the cycle wheel. A diameter of the center section is less than either a diameter of the first end and less than a diameter of the second end. The wheel hub is laterally centered between the forks by a first spacer and second spacer.

A preferred embodiment of the axle has the first axle structure comprised of a first half axle and the second axle structure comprised of a second half axle. The two half axles are joined together by an axle bolt, the joined half axles form the singular rigid axle. The first half axle has the cylindrical first end, an eccentric step, and a cylindrical first half axle offset section. The second half axle has the cylindrical second end, an eccentric second end step, and a cylindrical second half axle offset section.

Figure 1A:
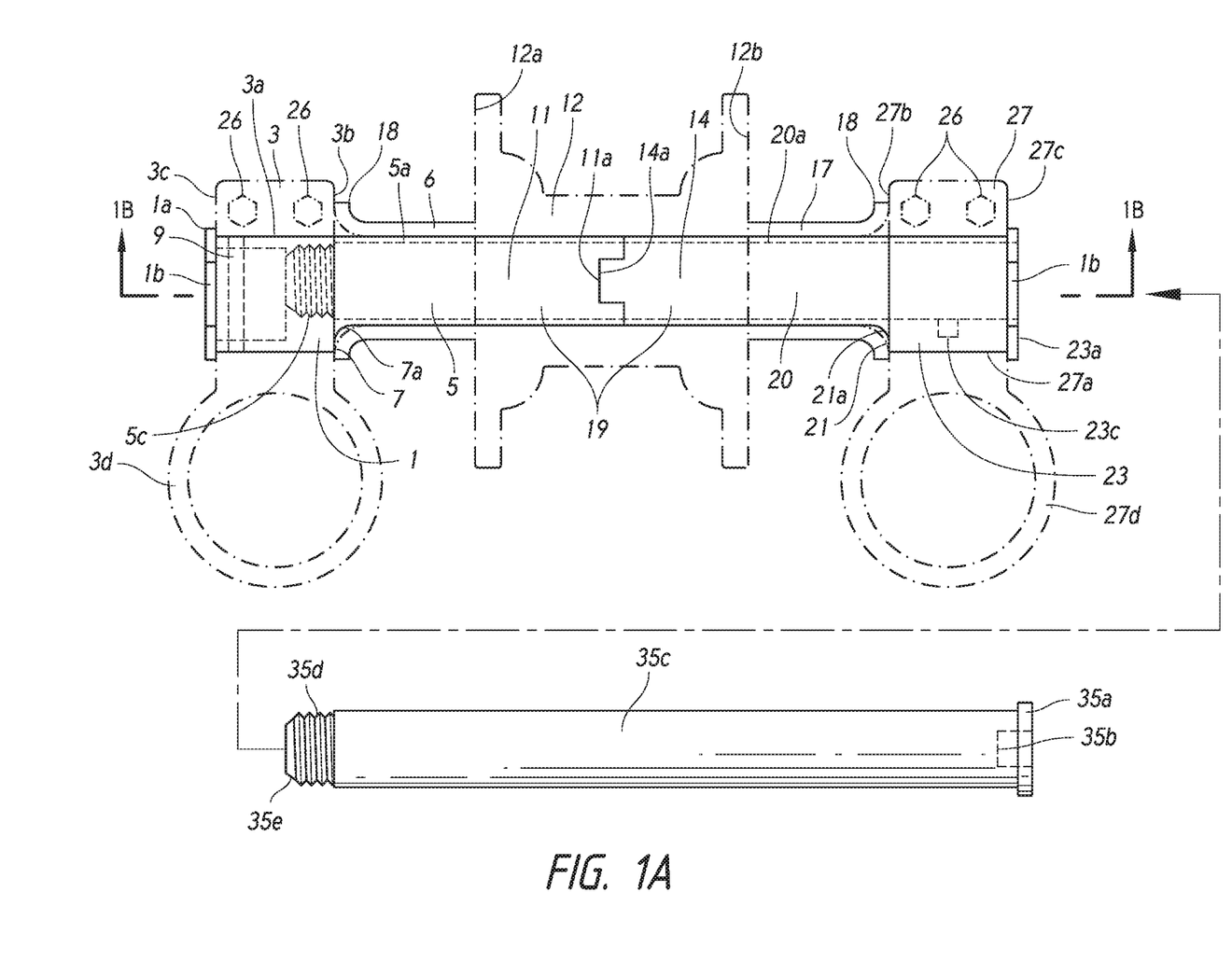
FIG. 1A is a top view of an axle embodiment housed in a split axle housing of a first fork, split axle housing of a second fork, and a wheel hub, a first spacer and a second spacer.
Figure 1B:
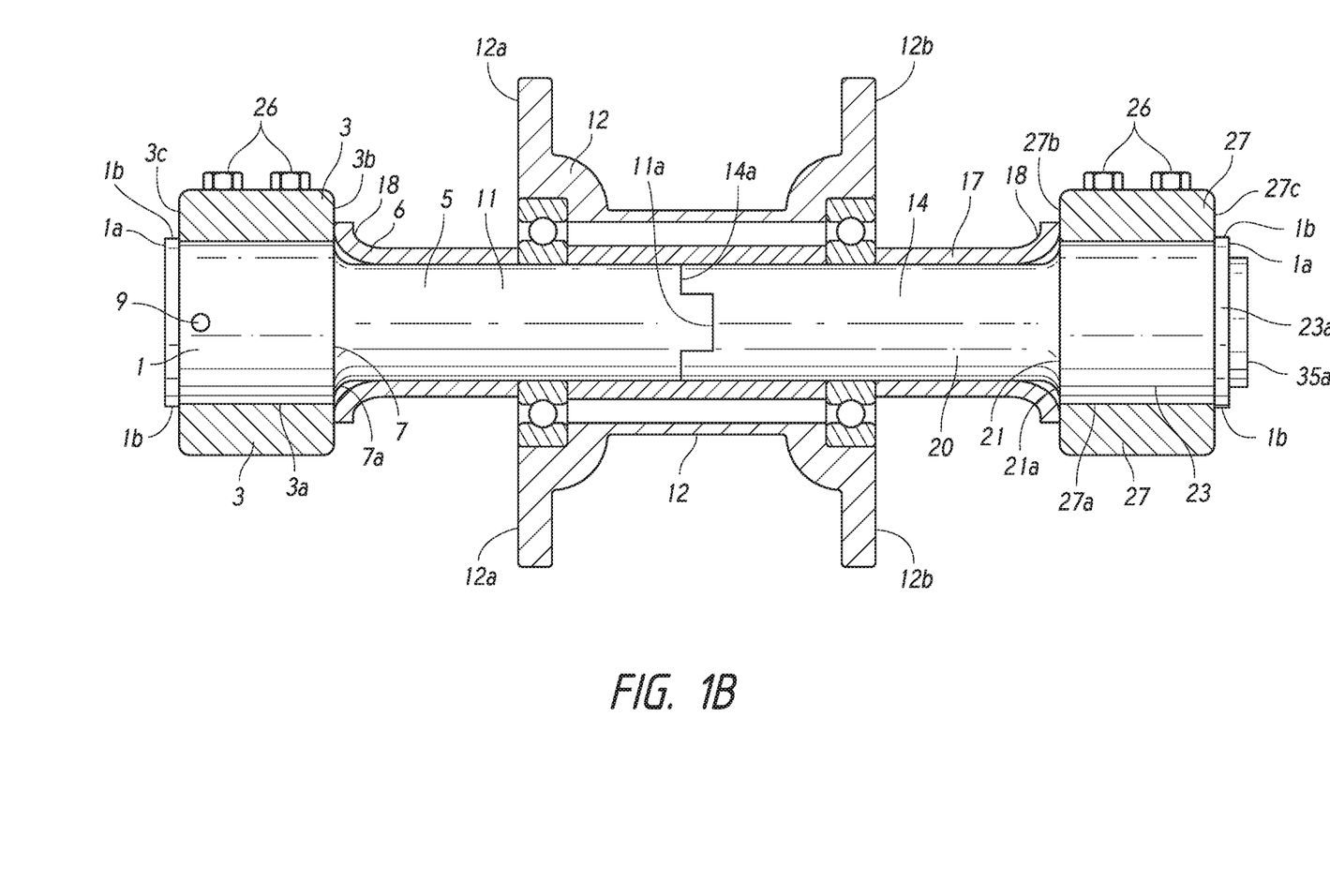
FIG. 1B is a cross-sectional view of FIG. 1A with the axle shown in side view.

FIGS. 1A and 1B show the preferred embodiment having: the first half axle 5, the first half axle offset section 11 and the first end 1; the first end is housed in the first fork split axle housing, the housing located near a first fork bottom 3*d*; the second half axle 20, the second half axle offset section 14 and the second end 23, the second end housed in the second fork split axle housing 27, the housing located near a second fork bottom 27*d*; the two half axles joined together with the axle bolt 35, the center section 19 of the joined axle, the center section located between the first end 1 and the second end 23; the first fork split axle housing 3, a first fork split axle housing bore 3*a*, a first fork split axle housing inner face 3*b*, a first fork split axle housing outer face 3*c*, and housing pinch bolts 26; the second fork split axle housing 27, a second fork split axle housing bore 27*a*, a second fork split axle housing inner face 27*b*, a second fork split axle housing outer face 27*c*, and housing pinch bolts 26.

FIGS. 1A and 1B show: the first end 1, a first end feature 9, a first end cap 1*a*, a discontinuous eccentric first end step 7, a first end step fillet 7*a*, and a first engagement feature 11*a*; the second end 23, a discontinuous eccentric second end step 21, a second end step fillet 21*a*, a second end extraction engagement feature 23*c*, a second end cap 23*a*, and a second engagement feature 14*a*; the center section 19, the wheel hub 12, a wheel hub first side 12*a* and a wheel hub second side 12*b*, the first spacer 6 and the second spacer 17; the axle bolt 35, an axle bolt head 35*a*, an axle bolt head feature 35*b*, axle bolt threads 35*d*, and axle bolt tapered tip 35*e*; and a second half axle bore 20*a*, a first half axle bore 5*a*, and internal threads of the first half axle bore 5*c*.

The first and second eccentric steps have the same offset distance. The first and second half axle offset sections of the joined axle form the center section 19. The wheel hub 12 is centered between the first and second forks by: a first spacer 6 on the center section 19 located between the first fork split axle housing 3 and the wheel hub first side 12*a*; and by a second spacer 17 on the center section 19 located between the second fork split axle housing 27 and the wheel hub second side 12*b*.

The first spacer is configured to receive and transfer the first inward longitudinal force, the transferred first inward longitudinal force applied to the wheel hub first side. A preferred embodiment of the axle has a first end configuration comprised of a distally located first end cap or a substantially continuous first end step, the first inward longitudinal force originates from either the first end cap or the substantially continuous first end step.

The second spacer is configured to receive and transfer the second inward longitudinal force, the transferred second inward longitudinal force applied to the wheel hub second side. A preferred embodiment of the axle has a second end configuration comprised of a distally located second end cap or a substantially continuous second end step, the second inward longitudinal force originates from either the second end cap or the substantially continuous second end step.

For illustrative purposes only, FIGS. 1A and 1B shows a discontinuous first end step 7 and a discontinuous second end step 21. For illustrative purposes only, FIG. 4 shows a substantially continuous second end step 21*b*.

Figure 2:
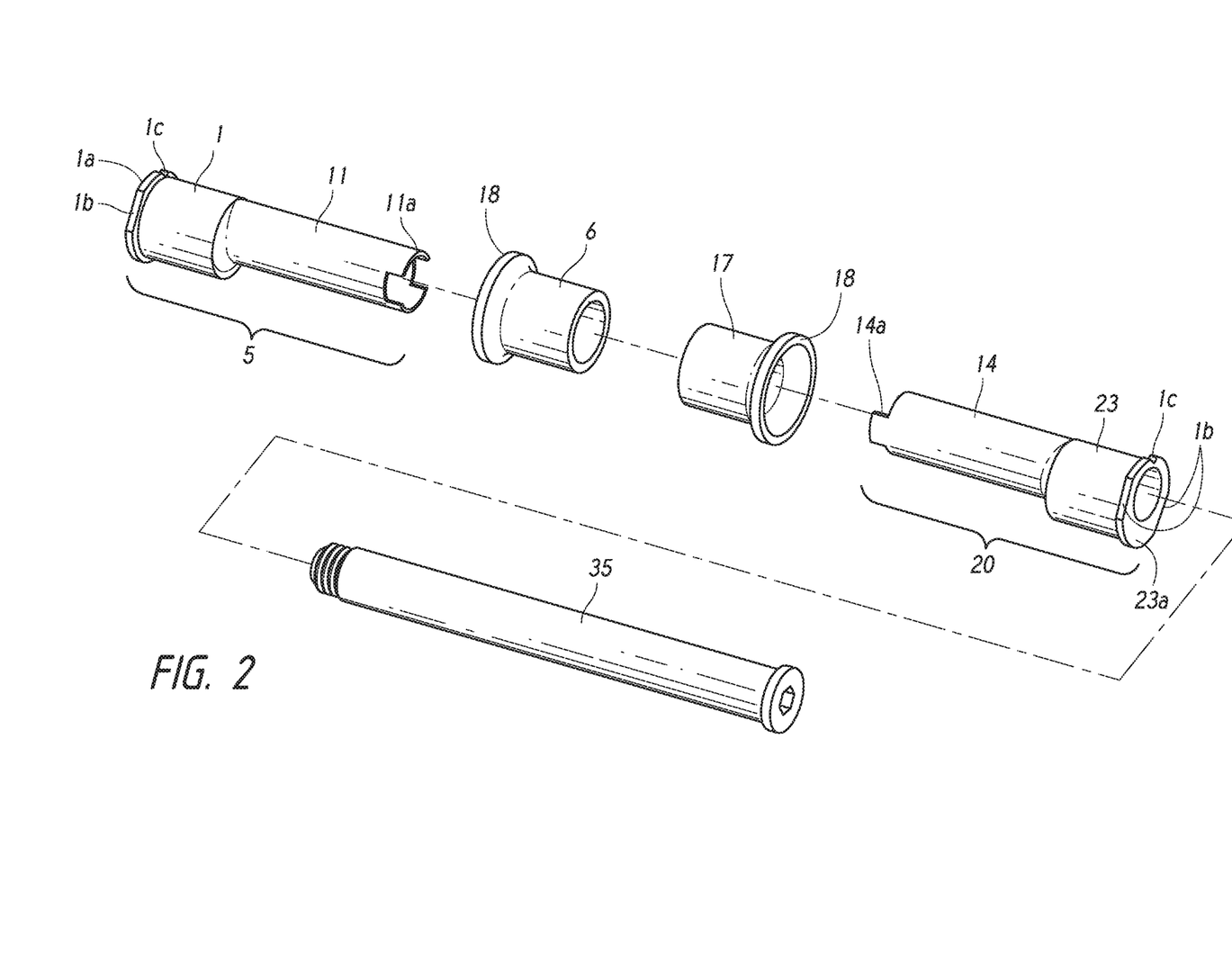
FIG. 2 is an exploded view of the axle embodiment of FIG. 1A, and the first and second spacers of FIG. 1A.

For illustrative purposes only, FIGS. 1A, 1B, and 2 show the preferred embodiment of the axle with the first end configured to apply the first inward longitudinal force by the first end cap 1*a* distally located on the first end 1, the force transferred through the first fork split axle housing 3, the housing transferring the force to the first wheel spacer 6, the spacer receiving and applying the force against the wheel hub first side 12*a*, the force provided by continuous abutment of the first end cap, the first fork split axle housing, and the first spacer. For illustrative purposes only, FIGS. 1A, 1B, and 2 show an embodiment configured to apply the second inward longitudinal force by the second end cap 23*a* distally located on the second end 23, the force transferred through the second fork split axle housing 27, the housing transferring the force to the second spacer 17, and the spacer applying the force against the wheel hub second side 12*b*, the force provided by continuously abutment of the second end cap, the second fork split axle housing, and the second spacer.

Figure 3:
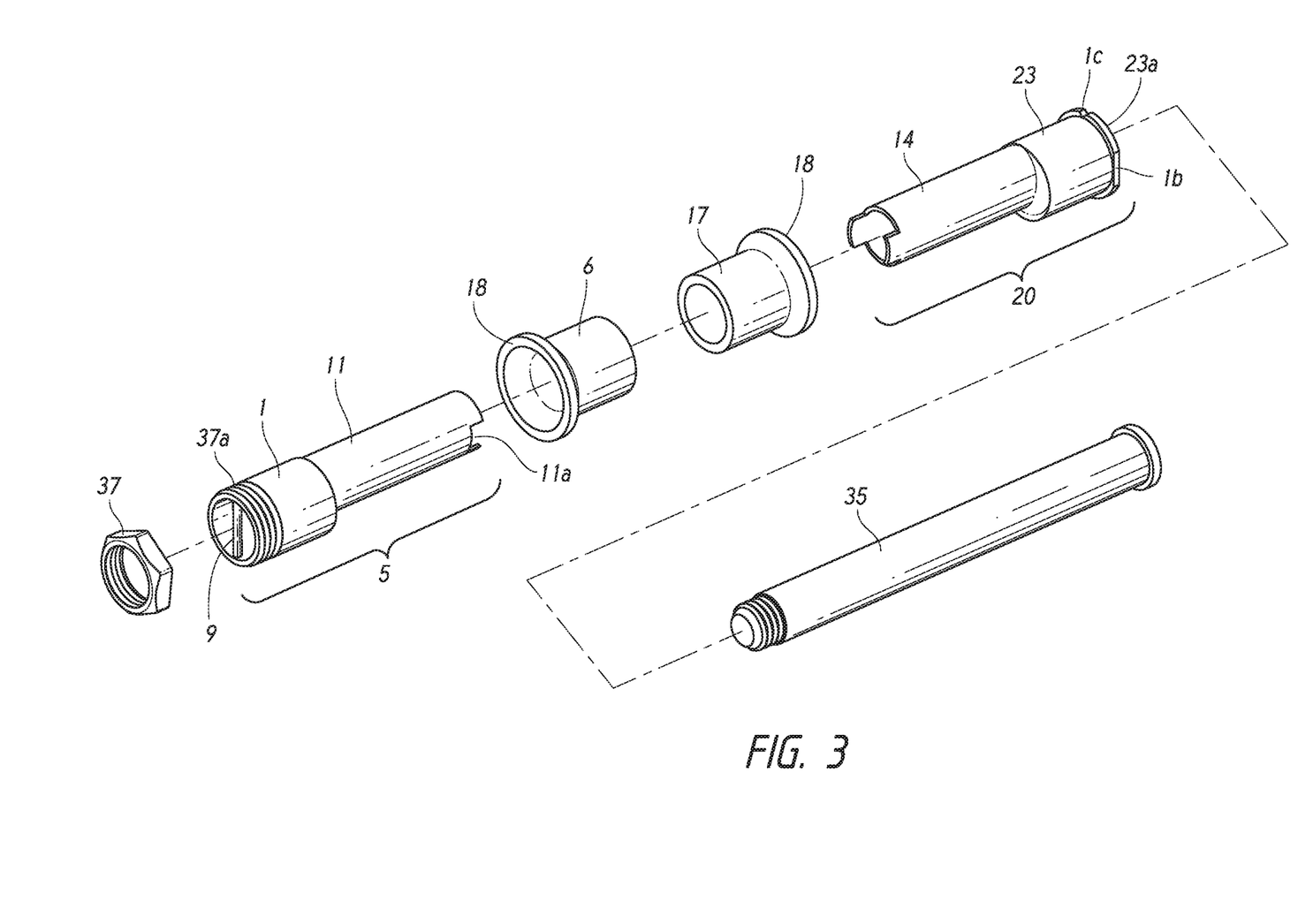
FIG. 3 is an exploded view of an axle embodiment having an axle nut.

It should be apparent to anyone skilled in the art, the first or second end cap could consist of an axle nut receive by threads. For illustrative purposes only, FIG. 3 shows a preferred embodiment of a split offset axle with the first axle end configured to apply the first inward longitudinal force by a threaded axle nut 37 received by distally located threads 37*a* of the first end 1, the force transferred through the first fork split axle housing 3, the housing transferring the force to the first spacer 6, the spacer applying the force against the wheel hub first side 12*a*, the force provided by continuous abutment of the axle nut, the first fork split axle housing, and the first spacer.

Figure 4:
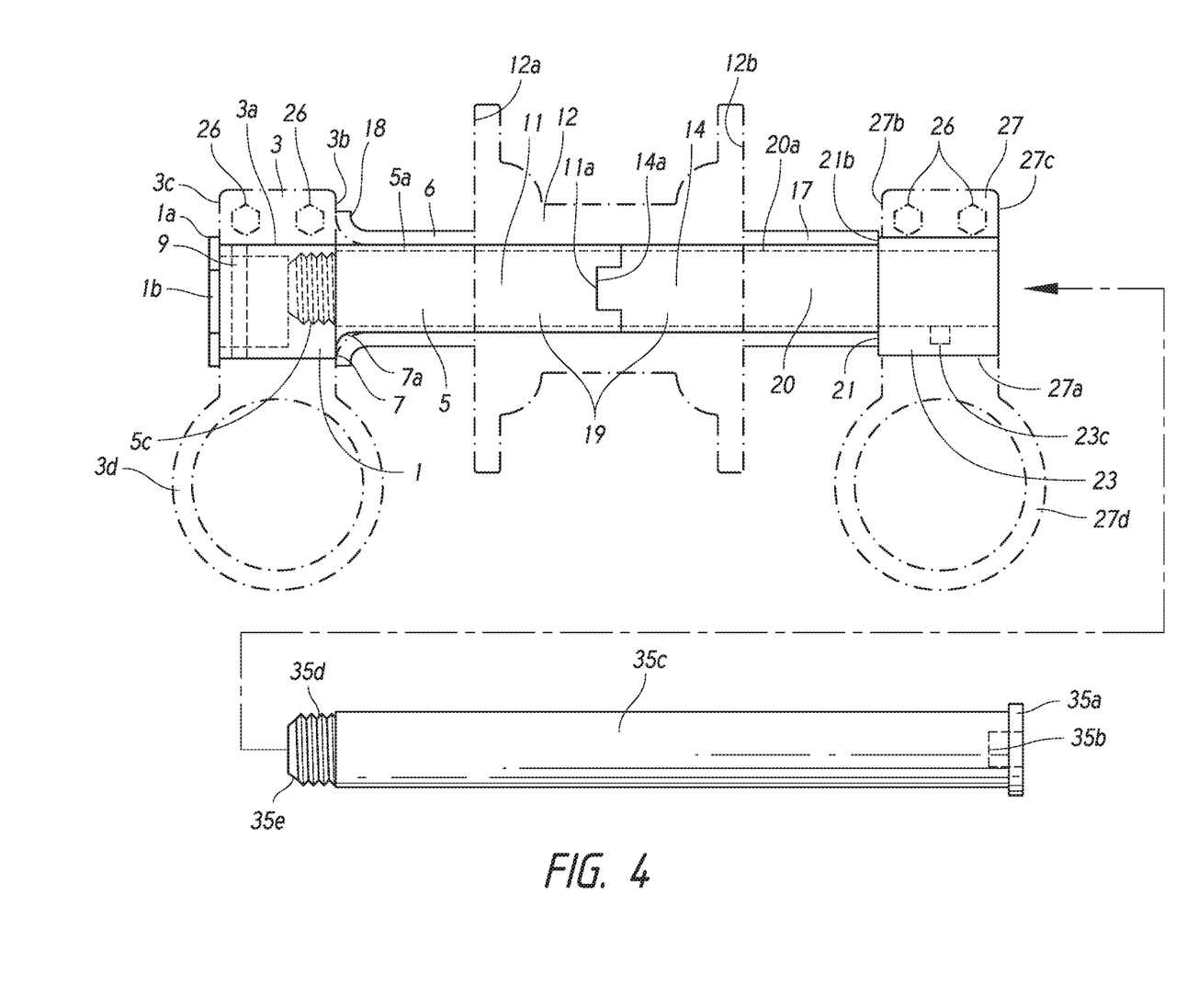
FIG. 4 is a top view of an axle embodiment having a substantially continuous eccentric step on one of the two half axles.

For illustrative purposes only, FIG. 4 shows a preferred embodiment of a split offset axle with the second end configured to apply the second inward longitudinal force by a substantially continuous second end step 21*b*, the step directly and continuously bearing against the second spacer 17*a*, the second spacer receiving and applying the force against the wheel hub second side 12*b*.

It should be apparent to anyone skilled in the art, the first end and the second end, the first fork split axle housing and the second fork split axle housing, the first end step and the second end step, and the first spacer and the second spacer could be configured in a plurality of ways to apply transfer and apply the first inward longitudinal force and second inward longitudinal force against the wheel hub first side and the wheel hub second side, respectively.

FIG. 1A shows the first half axle 5, the first half axle bore 5*a* concentric to the first half axle offset section 11, the bore continued eccentrically through a portion of the first end, the bore terminated with the first half axle bore internal threads 5*c*. FIG. 1A shows the second half axle 20, the second half axle bore 20*a* concentric to the second half axle offset section 14, the bore continued eccentrically through the second end 23, said bore having the same diameter as the first half axle bore 5*a*.

The first engagement feature 11*a* and second engagement feature 14*a* are configured to engage each other to: rotationally align the first half axle and second half axle with respect to their offsets; to rotationally secure the half axles to each other; and to longitudinally align the half axles. An applied torque to either half axle is transferred to the remaining half axle through engaged engagement features.

The first end feature 11*a* indicates the location of the center section 19 axis relative to the first fork bottom 3*d*, said feature is configured for rotationally engagement, the feature also configured for longitudinal engagement to extract the first half axle from an installed position. Rotation of the axle, by engagement of the first end feature, adjusts the center section axis to a plurality of positions. For illustrative purposes only, the first end feature 9 for the embodiments of FIGS. 1A, 1B, 3, and 4 utilizes a transverse internal pin, the pin oriented to indicate the rotational position of the center section axis.

The second end includes a second end feature indicating the location of the center section 19 axis relative to the second fork bottom 27d, said feature configured for rotational engagement. Rotation of the installed axle, by engagement of the second end feature, adjusts the center section to the plurality of locations. For illustrative purposes only, the second end feature for the embodiment of FIGS. 2 and 3 utilize two opposing cap flats 1b and a cap notch 1c on the second end cap 23.

The second half axle has an extraction engagement feature, the feature configured to engage a tool to extract the second half axle from the installed position. For illustrative purposes only, the second half axle extraction feature 23c for the embodiment of FIG. 1A is a second end internal notch located adjacent the second half axle bore.

It should be apparent to anyone skilled in the art, the first end and the second end could be configured in a plurality of manners to provide rotational engagement, to indicate center section axis position, and to provide longitudinal engagement to extract the respective first half axle and second half axle from installed positions. The wheel hub 12 is centered with the first spacer 6 and the second spacer 17 respectively, the spacers laterally locating and securing the wheel hub between the split axle housings. The first spacer is configured to receive and transfer the first inward longitudinal force, the transferred first inward longitudinal force applied to the wheel hub first side. The second spacer is configured to receive and transfer the second inward longitudinal force, the transferred second inward longitudinal force applied to the wheel hub second side.

For illustrative purposes only, FIG. 4 shows a configuration with the second spacer 17 directly and continuously abuts the second end step, the second end step having the continuous step 21b.

A spacer flange is utilized in configurations wherein the spacer directly and continuously abuts the adjacent split axle housing inner face. For illustrative purposes only, FIGS. 1A and 1B show the preferred embodiment of a split offset axle with the first spacer 6 and the second spacer 17 directly abutting the adjacent split axle housing inner face, each spacer having a flange 18, the flange has sufficient rigidity to substantially bridge the adjacent split axle housing bore.

It should be apparent to anyone skilled in the art, the first end and the second end, the first fork split axle housing and the second fork split axle housing, the first eccentric step and the second eccentric step, and the first spacer and the second spacer could be configured in a plurality of ways to provide continuous abutment to transfer and apply the first inward longitudinal force and the second inward longitudinal force, respectively.

The first half axle 5 is installed through the first fork split axle housing 3, the first spacer 6, and the wheel hub first side 12a. The second half axle 20 is partially installed through the second fork split axle housing 27, the second spacer 17, and the wheel hub second side 12b. The second half axle is completely installed after the second engagement feature 14a is aligned and engaged with the first engagement feature 11a. The axle bolt 35 is received by the second half axle bore 20a and the first half axle bore 5a. Threads of the axle bolt 35d are received by the first half axle bore internal threads 5c, the axle bolt is finger tightened, the axle is now partially installed.

The axle is adjusted by rotational engagement of the axle to a desired position, the axle bolt is torqued thereby joining the axle, the axle applies the first inward longitudinal force and the second inward longitudinal force against the wheel hub first side and wheel hub second side, respectively, the longitudinal forces laterally secures the wheel hub. The axle is completely installed by pinching the split axle housings, the pinched housings clamp the axle by direct engagement, the clamped housings rigidly and rotationally secure the axle to the cycle forks. For illustrative purposes only, housing pinch nuts 26 are utilized to pinch the split axle housings for the embodiments disclosed herein.

The offset represents half an offset range that occurs when the axle is rotated 180 degrees; hence, the offset range is twice the offset.

It should be apparent to anyone skilled in the art the axle may be hollow, or have hollow portions.

The invention claimed is:

1. A split offset axle connects a cycle wheel to a first fork and a second fork of a cycle, the axle is comprised of a first axle structure and a second axle structure, the axle structures are rigidly and rotationally joined together with a fastener to form the axle, the axle has a cylindrical offset center section, the center section locates and supports a wheel hub of the cycle wheel; a cylindrical first end of the axle is housed in a bore of a split axle housing of the first fork, the first end is configured to indicate the position of the center section, to provide rotational engagement, and to provide longitudinal engagement; a cylindrical second end of the axle is housed in a bore of a split axle housing of the second fork, the second end is configured to indicate the position of the center section, to provide rotation engagement, and to provide longitudinal engagement; the split axle housings directly engage the respective ends of the axle, wherein the housings are pinched to rotationally and rigidly connect the first end and the second end of the axle to the first and the second cycle fork, respectively.

2. The axle of claim 1, wherein, a longitudinal center axis of the first end is aligned with a longitudinal center axis of the second end, the center section is located between the first end and the second end, a longitudinal center axis of the center section is parallel to and offset from the center axis of the first end and the second end, a diameter of the center section is less than a diameter of the first end, the center section diameter is less than a diameter of the second end.

3. The axle of claim 2, wherein the first end of the axle is configured to apply a first inward longitudinal force, the first inward longitudinal force ultimately applied to a first side of the wheel hub, the second end of the axle is configured to apply a second inward longitudinal force, the second inward longitudinal force ultimately applied to a second side of the wheel hub.

4. The axle of claim 3, wherein the first end has an eccentric step, and the second end has an eccentric step.

5. The axle of claim 4, wherein rotation of the axle in the axle housings adjusts the cycle wheel to a plurality of positions relative to the cycle forks, a desired wheel position secured by pinching the axle housings.

6. The axle of claim 5, wherein the first fork split axle housing has an inner face and an outer face, the second fork split axle housing has an inner face and an outer face.

7. The axle of claim 6, wherein the wheel hub is centered with a first spacer and a second spacer, the first spacer is located between the first fork split axle housing and a first side of the wheel hub, the second spacer is located between the second fork split axle housing and a second side of the wheel hub.

8. The axle of claim 7, wherein the first spacer is configured to receive and transfer the first inward longitudinal force, the transferred first inward longitudinal force applied to the wheel hub first side.

9. The axle of claim 8, wherein the second spacer is configured to receive and transfer the second inward longitudinal force, the transferred second inward longitudinal force applied to the wheel hub second side.

10. The axle of claim 9, wherein the first spacer has a rigid spacer flange in configurations wherein the spacer directly abuts the first fork split axle housing inner face, the flange of the spacer directly abuts the first fork split axle housing inner face, the flange has sufficient diameter and thickness to substantially bridge the bore of the first fork split axle housing.

11. The axle of claim 10, wherein the second spacer has a rigid spacer flange in configurations wherein the second spacer directly abuts the second fork split axle housing inner face, the flange of the spacer directly abuts the second fork split axle housing inner face, the flange has sufficient diameter and thickness to substantially bridge the bore of the second fork split axle housing.

12. The axle of claim 11, wherein the first axle structure has an engagement feature, the second axle structure has an engagement feature, the first axle structure engagement feature and the second axle structure engagement feature are configured to engage each other, the engagement rotationally and linearly aligns the first and second axle structures with each other, the engagement rotationally secures the first and second half axle structures to each other.

13. The axle of claim 12, wherein rotation of the axle adjusts the position of the center section longitudinal axis to the desired position relative to the forks, the axle is rotated by rotational engagement of the first end feature or rotational engagement of the second end feature, the first fork split axle housing and the second fork split axle housings are pinched to secure the desired wheel position, the pinched first fork split axle housing and the pinched second fork split axle housing directly engage and clamp the first end and the second end, respectively.

14. The axle of claim 13, wherein the first axle structure is a first half axle, the second axle structure is a second half axle, the two half axles are joined together by the fastener, the fastener is comprised of an axle bolt, the joined half axles form the rigid singular axle.

15. The axle of claim 14, wherein the first half axle has the first end, the eccentric step of the first end, and a first half axle offset section of a cylindrical form, the second half axle has the second end, the eccentric step of the second end, and a second half axle offset section of a cylindrical form, a diameter of the second half axle offset section is equal to a diameter of the first half axle offset section.

16. The axle of claim 15, wherein the joined half axles have the cylindrical offset center section, the center section formed from the first half axle offset section and the second half axle offset section, the center section is located between and offset from the first end and the second end, the center section locates and supports the wheel hub of the cycle wheel, the center section diameter is less than the first end diameter, the center section diameter is less than the second end diameter, the longitudinal center axis of the center section is parallel to and offset from the longitudinal center axes of the first and second ends.

17. The axle of claim 16, wherein the first half axle has a first half axle bore concentric with the first half axle offset section, the bore continued eccentrically through a portion of the first end, the first half axle bore terminated with threads to receive threads of the axle bolt.

18. The axle of claim 17, wherein the second half axle has a second half axle bore concentric with the second half axle offset section, the second half axle bore continued eccentrically through the second end, a diameter of the second half axle bore is equal to a diameter of the first half axle bore.

19. The axle of claim 18, wherein the axle bolt is received by the second half axle bore, the first half axle bore, and threads of the first half axle bore, the axle bolt joins the half axles, the joined half axles form the axle, the first end of the axle is configured to apply the first inward longitudinal force, the second end of the axle is configured to apply the second inward longitudinal force.

20. The axle of claim 19, wherein the first end is configured with either a substantially continuous first end step or a distally located first end cap, the first inward longitudinal force is applied by either the substantially continuous first end step or the distally located first end cap.

21. The axle of claim 20, wherein the second end is configured with either a substantially continuous second end step or a distally located second end cap, the second inward longitudinal force is applied by either the substantially continuous second end step or the distally located second end cap.

* * * * *